US012598122B2

(12) United States Patent
Gan et al.

(10) Patent No.: US 12,598,122 B2
(45) Date of Patent: Apr. 7, 2026

(54) SYSTEMS AND METHODS FOR NETWORK PERFORMANCE EVALUATION

(71) Applicant: Verizon Patent and Licensing Inc., Basking Ridge, NJ (US)

(72) Inventors: Seng Gan, Ashburn, MA (US); Andrew F Patka, Holliston, MA (US); Ronald Carloni, Bloomfield, NJ (US); Sasirekha Magudapathi, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/632,594

(22) Filed: Apr. 11, 2024

(65) Prior Publication Data

US 2025/0323850 A1     Oct. 16, 2025

(51) Int. Cl.
| | |
|---|---|
| *H04L 41/12* | (2022.01) |
| *H04L 41/069* | (2022.01) |
| *H04L 41/5054* | (2022.01) |
| *H04L 43/08* | (2022.01) |
| *H04L 47/70* | (2022.01) |
| *H04W 24/08* | (2009.01) |
| *H04W 4/029* | (2018.01) |
| *H04W 24/02* | (2009.01) |

(52) U.S. Cl.
CPC .............. *H04L 43/08* (2013.01); *H04L 47/82* (2013.01); *H04W 24/08* (2013.01)

(58) Field of Classification Search
CPC ......... H04L 43/08; H04L 47/82; H04L 41/12; H04L 41/069; H04L 41/5054; H04W 24/08; H04W 4/029; H04W 24/02
USPC .......................................................... 709/224
See application file for complete search history.

(56) References Cited

U.S. PATENT DOCUMENTS

| | | | | |
|---|---|---|---|---|
| 11,678,200 B2 * | 6/2023 | Jat | .......................... | H04W 4/021 |
| | | | | 455/225 |
| 11,792,662 B2 * | 10/2023 | Jat | .......................... | H04W 24/02 |
| | | | | 370/252 |
| 12,040,933 B2 * | 7/2024 | Thomas | ................ | H04L 41/069 |
| 2010/0246421 A1 * | 9/2010 | Marshall | ................. | H04L 41/12 |
| | | | | 370/252 |
| 2023/0125903 A1 * | 4/2023 | Kozin | .................... | H04W 24/04 |
| | | | | 455/456.1 |

* cited by examiner

*Primary Examiner* — Jude Jean Gilles

(57) ABSTRACT

In an example, a location associated with a network performance issue may be identified. A plurality of stationary networking devices proximal the location may be identified. Measurement data associated with wireless communication between the plurality of stationary networking devices and wireless communication sites of a telecommunication service provider may be retrieved. The measurement data may be derived from signal measurements performed during a period of time. A network performance profile associated with the network performance issue may be generated based upon the measurement data.

20 Claims, 10 Drawing Sheets

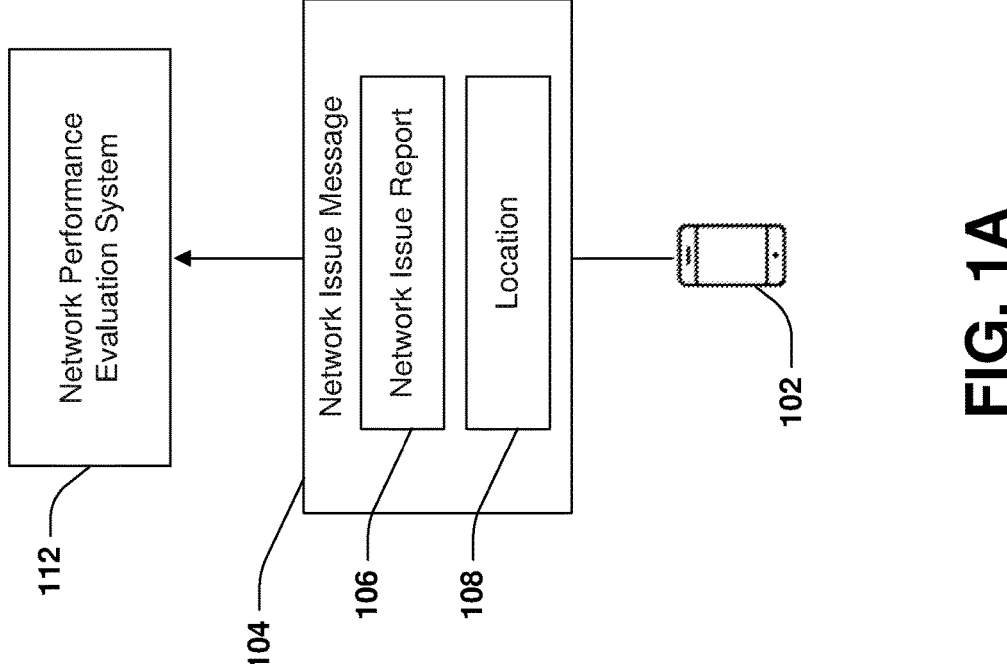
FIG. 1A

116a
116c
108
116b
116d
118
101

200

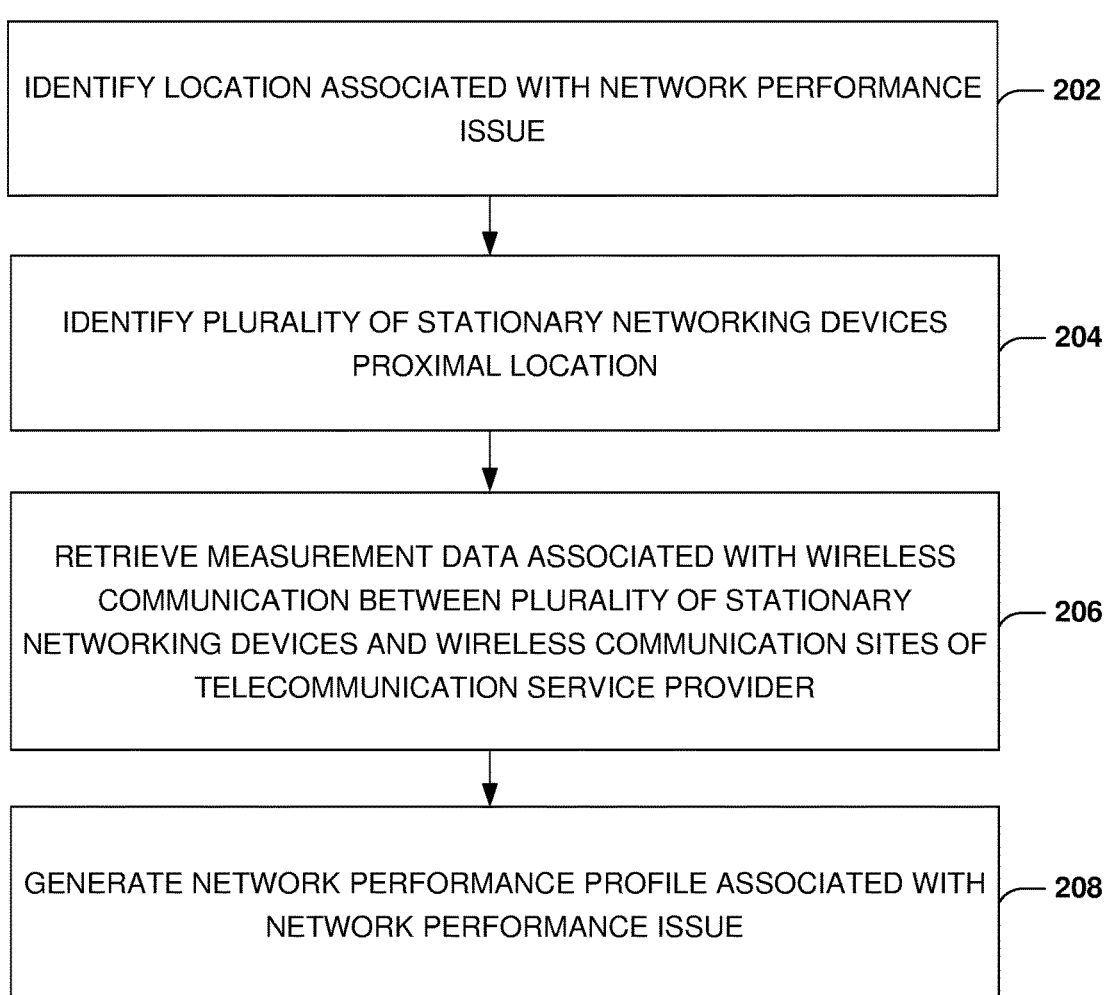

IDENTIFY LOCATION ASSOCIATED WITH NETWORK PERFORMANCE ISSUE — 202

IDENTIFY PLURALITY OF STATIONARY NETWORKING DEVICES PROXIMAL LOCATION — 204

RETRIEVE MEASUREMENT DATA ASSOCIATED WITH WIRELESS COMMUNICATION BETWEEN PLURALITY OF STATIONARY NETWORKING DEVICES AND WIRELESS COMMUNICATION SITES OF TELECOMMUNICATION SERVICE PROVIDER — 206

GENERATE NETWORK PERFORMANCE PROFILE ASSOCIATED WITH NETWORK PERFORMANCE ISSUE — 208

FIG. 2

SYSTEMS AND METHODS FOR NETWORK PERFORMANCE EVALUATION

BACKGROUND

Wireless communication services, such as cellular services, wireless internet services, etc. may be used by organizations, companies, universities and other entities to interconnect people, machines, vehicles, sensors and other devices.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1A is a diagram illustrating an example system comprising a network performance evaluation system receiving a network issue message from user equipment (UE) in accordance with an embodiment.

FIG. 2 is a flow chart illustrating an example method for evaluating a network performance issue in accordance with an embodiment.

DETAILED DESCRIPTION OF EXAMPLE EMBODIMENTS

Figure 1B:
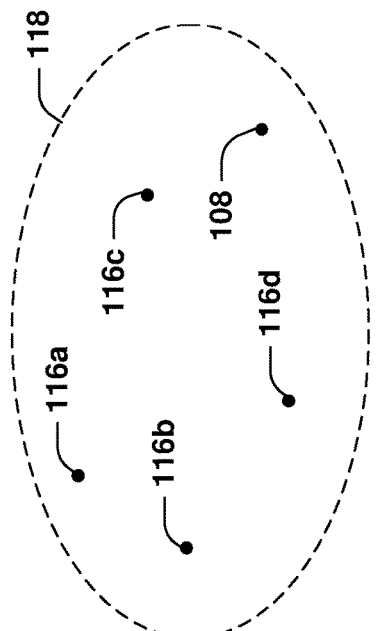
FIG. 1B is a diagram illustrating identification of a network issue location associated with a network performance issue in accordance with an embodiment.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

In accordance with some embodiments of the present disclosure, a network performance evaluation system is provided for evaluating (e.g., troubleshooting) network performance associated with telecommunication service provided to User Equipment (UE). In an example, one or more users may contact a technical support service associated with the telecommunication service to submit a network issue message due to experiencing a network performance issue (e.g., at least one of weak service, inconsistent connection, low internet speed, etc.). In the example, operations provided herein may be triggered by the technical support service to identify and/or isolate a network performance issue associated with the UE. Alternatively and/or additionally, the operations provided herein may be triggered (e.g., automatically triggered) at regular and/or irregular intervals for monitoring network performance associated with the telecommunication service.

In some examples, the network performance evaluation system may identify a plurality of stationary networking devices proximal (e.g., within a threshold distance of) a network issue location associated with the network performance issue. The network performance evaluation system may retrieve measurement data associated with wireless communication between the plurality of stationary networking devices and wireless communication sites of a telecommunication service provider, and/or may use the measurement data to identify entities (e.g., stationary networking devices, frequency bands, wireless communication sites, wireless communication links, etc.) associated with a change in wireless communication performance (e.g., a negative change in wireless communication performance, such as a decrease in RF signal quality, an increase in latency, etc.) over at least a portion of a period of time. The network performance evaluation system may evaluate the network performance issue based upon the entities and/or geolocations associated with the entities to determine a first source of the network performance issue and/or to isolate a problem area associated with the network performance issue to a first region of interest. One or more corrective actions may be performed to remedy (e.g., solve) the network performance issue. For example, the network performance evaluation system may allocate one or more resources to one or more components of the first region of interest (to improve network performance of the one or more components, for example).

In some examples, a stationary networking device may be positioned at a fixed location (e.g., in at least one of a home, a home office, a satellite office, etc.) and/or may be used by one or more users (e.g., a household) at the fixed location to access one or more networks (e.g., the Internet). In some examples, the stationary networking device may be configured (as part of a handover requirement, for example) to (i) continuously (and/or periodically) measure signals from wireless communication sites within a coverage area of the stationary networking device, and/or (ii) continuously (and/or periodically) report measured wireless communication metrics to one or more entities (e.g., one or more wireless communication sites and/or the network performance evaluation system), which may store the measured wireless communication metrics in a data store accessible to the network performance evaluation system.

It may be appreciated that identifying the plurality of stationary networking devices and/or using measurement data associated with the plurality of stationary networking devices to evaluate the network performance issue may provide for more accurate identification of the entities, the first source and/or the first region of interest associated with the network performance issue. The increased accuracy may be due, at least in part, to locations of the plurality of stationary networking devices being relatively static. Thus, geolocations available to the network performance evaluation system for the plurality of stationary networking devices may be more accurate (as compared with geolocations for mobile devices that are portable and/or whose locations do not match geolocations on record due to recent movement).

FIGS. 1A-1G illustrate an example of a system 101 comprising a network performance evaluation (e.g., troubleshooting) system 112. The network performance evaluation system 112 may be used to evaluate a network performance issue associated with a telecommunication service provider. FIG. 1A illustrates the network performance evaluation system 112 receiving a first network issue message 104 from a first UE 102. In some examples, the first UE 102 comprises at least one of a laptop, a phone, a tablet, etc. The first network issue message 104 may comprise a network issue report 106 and/or a first report location 108 (e.g., a pinned location). The first network issue message 104 may be received via a customer service interface displayed on the first UE 102 using at least one of an application (e.g., a mobile application, a web application, etc.), a web page, etc. For example, the customer service interface may provide one or more interface features that allows a user to submit the network issue report 106 (e.g., the customer service interface may comprise a text field that the user can use to enter a description of the network performance issue) and/or the first report location 108 (e.g., the customer service interface may provide a map interface that allows the user to choose a pin location on a map to identify the first report location 108 associated with the network performance issue). For example, the network issue report 106 may identify one or more problems that the user is having with the telecommunication service provider (e.g., low internet download and/or upload speed, connection cutting out during voice calls, texting issues, etc.). Alternatively and/or additionally, the first network issue message 104 may be submitted by the user physically (at a physical retail location of the telecommunication service provider, for example), over a call (e.g., a telephone call with a technical support representative of the telecommunication service provider) and/or by other means.

An embodiment of evaluating the network performance issue is illustrated by an example method 200 of FIG. 2, and is further described in conjunction with FIGS. 1A-1G. At 202, the network performance evaluation system 112 may identify a network issue location associated with the network performance issue. In some examples, the network performance evaluation system 112 may determine the network issue location based one or more upon report locations indicated by one or more network issue messages received from one or more UEs. For example, the one or more network issue messages may comprise the first network issue message 104 and/or other network issue messages received from other users. FIG. 1B illustrates identification of the network issue location (shown with reference number 118) associated with the network performance issue. The network issue location 118 may correspond to an area comprising the first report location 108 received from the first UE 102 and/or other report locations (e.g., report locations 116a, 116b, 116c, 116d, etc.) indicated by other network issue messages received from other UEs (other than the first UE 102). In an example, the network performance evaluation system 112 may identify the network issue location 118 associated with the network performance issue (and/or may trigger an evaluation process associated with the network performance issue and/or the network issue location 118) in response to receiving network issue messages, associated with the network issue location 118, amounting to at least a threshold quantity of messages.

At 204, the network performance evaluation system 112 may identify a plurality of stationary networking devices proximal the network issue location 118. In some examples, the network performance evaluation system 112 may identify the plurality of stationary networking devices using a geolocation database indicative of geolocations of stationary networking devices associated with the telecommunication service provider. The plurality of stationary networking devices may comprise a first stationary networking device associated with a first geolocation indicated by the geolocation database, a second stationary networking device associated with a second geolocation indicated by the geolocation database, etc. A stationary networking device may be included in the plurality of stationary networking devices based upon a determination that a geolocation associated with the stationary networking device is within a first threshold distance of the network issue location 118. For example, the first stationary networking device may be included in the plurality of stationary networking devices based upon a determination that the first geolocation associated with the first stationary networking device is within the first threshold distance of the network issue location 118. The second stationary networking device may be included in the plurality of stationary networking devices based upon a determination that the second geolocation associated with the second stationary networking device is within the first threshold distance of the network issue location 118. In an example, the first threshold distance may be between about 50 meters to about 200 meters (e.g., the first threshold distance may be about 100 meters) or other value.

Figure 1C:
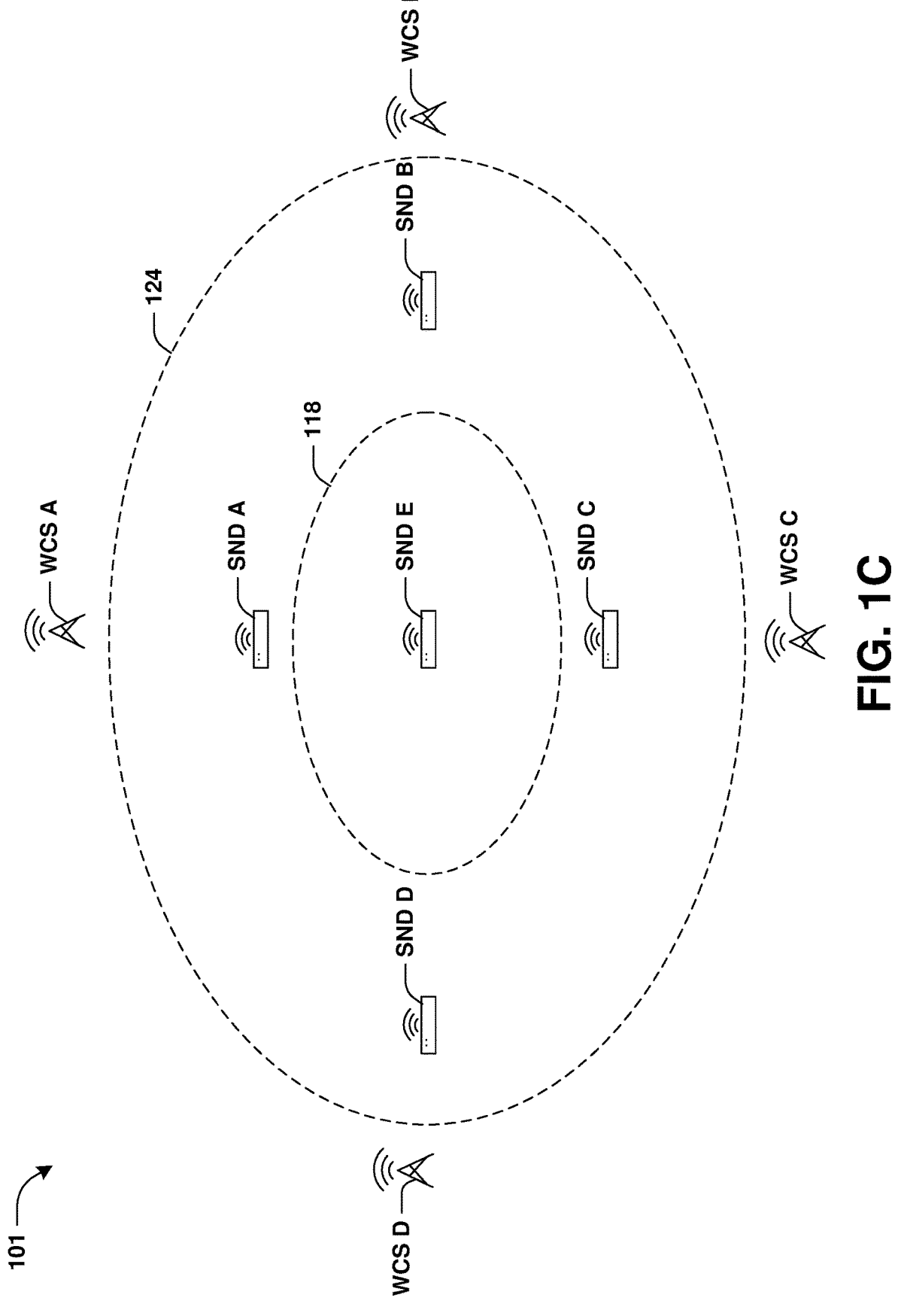
FIG. 1C is a diagram illustrating identification of a plurality of stationary networking devices proximal a network issue location in accordance with an embodiment.

FIG. 1C illustrates identification of the plurality of stationary networking devices proximal the network issue location 118. For example, the plurality of stationary networking devices may comprise the first stationary networking device (shown with reference SND A), the second stationary networking device (shown with reference SND B), a third stationary networking device SND C, a fourth stationary networking device SND D, and/or a fifth stationary networking device SND E. The network performance evaluation system 112 may determine a first area 124 based upon the network issue location 118 (e.g., the first area 124 may correspond to an enlarged version of an area corresponding to the network issue location 118). The network performance evaluation system 112 may determine the plurality of stationary networking devices to include stationary networking devices associated with geolocations that are within the first area 124.

In some examples, the first stationary networking device SND A may comprise a Fixed Wireless Access (FWA) device. In some examples, the first stationary networking device SND A may be positioned at a fixed location (e.g., in at least one of a home, a home office, a satellite office, etc.) and/or may be used by one or more users (e.g., a household) at the fixed location to access one or more networks (e.g., the Internet). Thus, the first stationary networking device SND A may be stationary (such that the first geolocation is a more accurate representation of the first stationary networking device SND A's location compared to a geolocation of a mobile device that changes location more often, for example). In some examples, the first stationary networking device SND A may provide devices (e.g., devices that are within range of the first stationary networking device SND A) with network connections (e.g., Internet connections). For example, the first stationary networking device SND A may be connected with a client device over a wireless local area network (WLAN). The first stationary networking device SND A may have telecommunication service provided by the telecommunication service provider (via a connection with a wireless communication site of the telecommunication service provider, for example). When the first stationary networking device SND A is within coverage of telecommunication service provided by the telecommunication service provider (e.g., when the first stationary networking device SND A is within a threshold distance of a wireless communication site of the telecommunication service provider), the first stationary networking device SND A may share the telecommunication service with the client device (over the WLAN, for example). In some examples, the first stationary networking device SND A may comprise a smartphone, a wearable device, etc. that has a mobile hotspot (e.g., personal hotspot) function in addition to other features for at least one of calling, browsing, texting, etc. Alternatively and/or additionally, the first stationary networking device SND A may comprise a portable hotspot (e.g., a dedicated and/or standalone hotspot device, such as a portable hotspot device comprising a modem and/or router) configured to provide the client device (and/or one or more other client devices within range) with network connections (e.g., Internet connections). In some examples, each stationary networking device of one, some or all of the plurality of stationary networking devices has one, some or all of the features, characteristics, components, etc. discussed herein with respect to the first stationary networking device SND A.

At 206, the network performance evaluation system 112 may retrieve measurement data associated with wireless communication between the plurality of stationary networking devices and wireless communication sites of the telecommunication service provider. The measurement data may be derived from signal measurements performed during a first period of time (e.g., the signal measurements may be performed by the plurality of stationary networking devices and/or the wireless communication sites). In some examples, the measurement data comprises wireless communication metrics (e.g., Radio Frequency (RF) signal metrics, such as at least one of RF signal strength, RF signal quality, etc.) associated with communication of wireless signals (e.g., RF signals) between stationary networking devices and wireless communication sites.

In some examples, in the present disclosure, usable types of wireless communication metrics may comprise at least one of (i) one or more Reference Signal Received Power (RSRP) values (e.g., a minimum RSRP value, a maximum RSRP value, an average RSRP value, a median RSRP value, etc.), (ii) one or more Reference Signal Received Quality (RSRQ) values (e.g., a minimum RSRQ value, a maximum RSRQ value, an average RSRQ value, a median RSRQ value, etc.), (iii) one or more Channel Quality Indicator (CQI) values (e.g., a minimum CQI value, a maximum CQI value, an average CQI value, a median CQI value, etc.), (iv) one or more uplink (UL) Signal to Interference and/or Noise Ratio (SINR) values (e.g., a minimum UL SINR value, a maximum UL SINR value, an average UL SINR value, a median UL SINR value, etc.), (v) one or more downlink (DL) SINR values (e.g., a minimum DL SINR value, a maximum DL SINR value, an average DL SINR value, a median DL SINR value, etc.), and/or (vi) one or more other types of wireless communication metrics.

The measurement data may comprise a plurality of sets of wireless communication metrics associated with the plurality of stationary networking devices. Each set of wireless communication metrics of the plurality of sets of wireless communication metrics may comprise wireless communication metrics associated with one or more stationary networking devices of the plurality of stationary networking devices. For example, the plurality of sets of wireless communication metrics may comprise a first set of wireless communication metrics associated with a first set of one or more stationary networking devices and/or other sets of wireless communication metrics associated with other stationary networking devices of the plurality of stationary networking devices. In some examples, each set of wireless communication metrics of the plurality of sets of wireless communication metrics comprises one or more of the usable types of wireless communication metrics.

In an example, the first set of stationary networking devices comprises the first stationary networking device SND A. The first set of wireless communication metrics may be indicative of a first set of one or more wireless communication sites (e.g., base stations) with which the first stationary networking device SND A communicates during the first period of time. The first set of wireless communication sites may comprise wireless communication sites that are within a coverage area of the first stationary networking device SND A. For example, the first set of wireless communication sites may comprise (i) a serving wireless communication site to which the first stationary networking device SND A is connected (via a Radio Resource Control (RRC) connection, for example) and/or (ii) measured wireless communication sites from which the first stationary networking device SND A receives signals (e.g., test signals) that are measured by the first stationary networking device SND A. For example, when the first stationary networking device SND A is in connected mode (e.g., RRC_CONNECTED state) with the serving wireless communication site, the first stationary networking device SND A may periodically and/or continuously (and/or aperiodically and/or discontinuously) measure signals (e.g., test signals) emitted by the measured wireless communication sites (e.g., neighboring wireless communication sites).

In an example, the first set of wireless communication sites may comprise a first wireless communication site WCS A (shown in FIG. 1C), a second wireless communication site WCS B, a third wireless communication site WCS C, and/or a fourth wireless communication site WCS D. For example, the first wireless communication site WCS A may correspond to a serving wireless communication site that provides the first stationary networking device SND A with telecommunication service (e.g., internet service). The second wireless communication site WCS B, the third wireless communication site WCS C, and/or the fourth wireless communication site WCS D may correspond to measured wireless communication sites (neighboring the first stationary networking device SND A, for example) that emit signals (e.g., test signals) that are measured (e.g., continuously measured) by the first stationary networking device SND A to determine wireless communication metrics (comprising one or more of the usable types of wireless communication metrics, for example).

In some examples, the first set of wireless communication metrics may comprise metrics associated with a plurality of frequency bands. Each frequency band of the plurality of frequency bands may correspond to a range of frequencies a wireless communication site uses to transmit signals (e.g., wireless signals). The plurality of frequency bands may comprise at least one of C-band (e.g., between 3.4 Gigahertz (GHz) and 4.2 GHZ), one or more millimeter-wave (mm-Wave) bands, etc. For each frequency band of one, some or all of the plurality of frequency bands, the first set of wireless communication metrics may comprise wireless communication metrics (comprising one or more of the usable types of wireless communication metrics, for example) associated with wireless communication between the first stationary networking device SND A and the first set of wireless communication sites using the frequency band.

In some examples, for each wireless communication site of one, some or all of the first set of wireless communication sites, the first set of wireless communication metrics may comprise wireless communication metrics (comprising one or more of the usable types of wireless communication metrics, for example) associated with wireless communication between the first stationary networking device SND A and the wireless communication site. For example, the first set of wireless communication metrics may comprise (i) one or more wireless communication metrics associated with wireless communication between the first stationary networking device SND A and the first wireless communication site WCS A (e.g., the one or more wireless communication metrics may comprise metrics for each frequency band of one, some or all of the plurality of frequency bands), (ii) one or more wireless communication metrics (e.g., metrics for each frequency band of one, some or all of the plurality of frequency bands) associated with wireless communication between the first stationary networking device SND A and the second wireless communication site WCS B, (iii) one or more wireless communication metrics (e.g., metrics for each frequency band of one, some or all of the plurality of frequency bands) associated with wireless communication between the first stationary networking device SND A and the third wireless communication site WCS C, and/or (iv) one or more wireless communication metrics (e.g., metrics for each frequency band of one, some or all of the plurality of frequency bands) associated with wireless communication between the first stationary networking device SND A and the fourth wireless communication site WCS D.

In some examples, the network performance evaluation system 112 uses a grouping module to group stationary networking devices (e.g., stationary networking devices in the first area 124) into a plurality of groups. The plurality of sets of wireless communication metrics may be determined based upon the plurality of groups. In an example, the first set of stationary networking devices corresponds to a first group (of the plurality of groups) grouped together using the grouping module. Wireless communication metrics associated with the first group of stationary networking devices may be combined (e.g., aggregated) to determine the first set of wireless communication metrics.

Figure 1D:
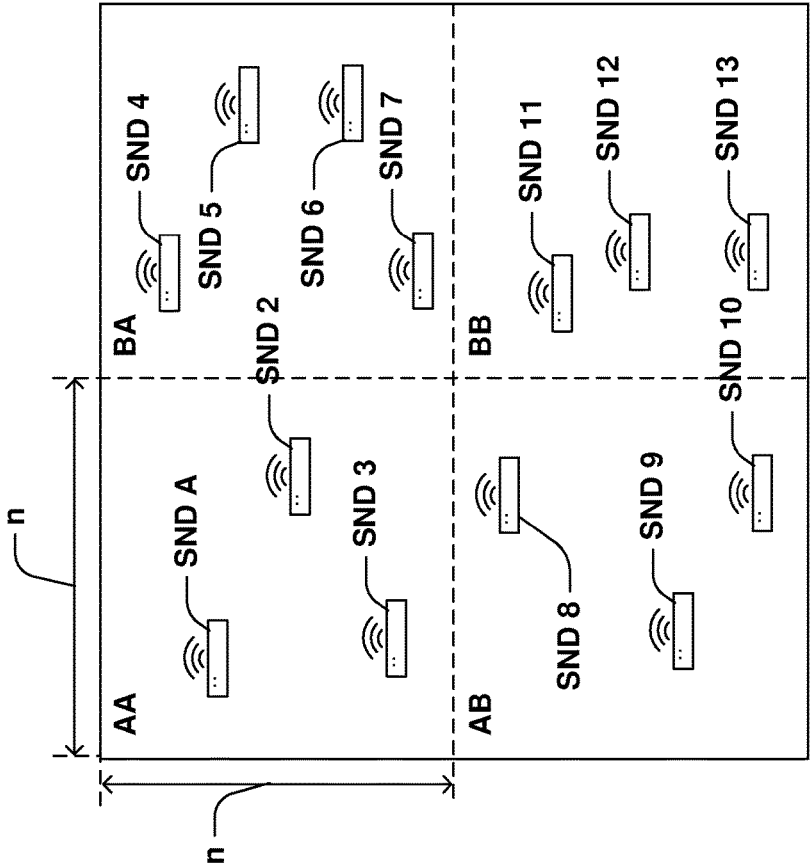
FIG. 1D is a diagram illustrating application of a grid to an area to define a plurality of sections in accordance with an embodiment.

In an example, the grouping module may apply a grid to a second area to define a plurality of sections of the second area. In some examples, the second area may be the same as (and/or may comprise at least a portion of) the first area 124. FIG. 1D illustrates a representation of applying the grid to the second area to define the plurality of sections comprising a first section AA, a second section BA, a third section AB and/or a fourth section BB. Each section of one, some or all of the plurality of sections may correspond to a square with sides equal to about n. In an example, n may be between about 5 meters to about 15 meters (e.g., n may be about 10 meters) or other value.

In some examples, stationary devices are grouped into the plurality of groups based upon sections of the plurality of sections in which the stationary devices are located. For example, the first stationary networking device SND A, a stationary networking device SND 2 and/or a stationary networking device SND 3 may be grouped into the first group based upon geolocations of the first stationary networking device SND A, the stationary networking device SND 2 and/or the stationary networking device SND 3 being within the first section AA.

Wireless communication metrics associated with the first group of stationary networking devices may be determined and/or combined (e.g., aggregated) to determine the first set of wireless communication metrics. For example, the wireless communication metrics may comprise (i) SND A metrics associated with the first stationary networking device SND A, (ii) SND 2 metrics associated with the stationary networking device SND 2 and/or (iii) SND 3 metrics associated with the stationary networking device SND 3.

The SND A metrics may comprise one or more first metrics associated with wireless communication between the first stationary networking device SND A and the first wireless communication site WCS A. The SND 2 metrics may comprise one or more second metrics associated with wireless communication between the stationary networking device SND 2 and the first wireless communication site WCS A. The SND 3 metrics may comprise one or more third metrics associated with wireless communication between the stationary networking device SND 3 and the first wireless communication site WCS A.

The first set of wireless communication metrics may comprise one or more fourth metrics associated with wireless communication between the first group of stationary networking devices and the first wireless communication site WCS A. The one or more fourth metrics may be determined based upon the one or more first metrics, the one or more second metrics and/or the one or more third metrics. The one or more fourth metrics may comprise one or more of the usable types of wireless communication metrics (e.g., a minimum, maximum, average and/or median wireless communication metric). For example, the one or more fourth metrics may comprise a RSRP value (e.g., a minimum RSRP value, a maximum RSRP value, an average RSRP value, a median RSRP value, etc.) determined based upon one or more RSRP values of the one or more first metrics, one or more RSRP values of the one or more second metrics and/or one or more RSRP values of the one or more third metrics.

The SND A metrics may comprise one or more fifth metrics associated with wireless communication between the first stationary networking device SND A and the second wireless communication site WCS B. The SND 2 metrics may comprise one or more sixth metrics associated with wireless communication between the stationary networking device SND 2 and the second wireless communication site WCS B. The SND 3 metrics may comprise one or more seventh metrics associated with wireless communication between the stationary networking device SND 3 and the second wireless communication site WCS B.

The first set of wireless communication metrics may comprise one or more eighth metrics associated with wireless communication between the first group of stationary networking devices and the second wireless communication site WCS B. The one or more eighth metrics may be determined based upon the one or more fifth metrics, the one or more sixth metrics and/or the one or more seventh metrics. The one or more eighth metrics may comprise one or more of the usable types of wireless communication metrics (e.g., a minimum, maximum, average and/or median wireless communication metric). For example, the one or more eighth metrics may comprise a RSRP value (e.g., a minimum RSRP value, a maximum RSRP value, an average RSRP value, a median RSRP value, etc.) determined based upon one or more RSRP values of the one or more fifth metrics, one or more RSRP values of the one or more sixth metrics and/or one or more RSRP values of the one or more seventh metrics.

Alternatively and/or additionally, the grouping module may determine a second group of the plurality of groups based upon stationary networking devices that are associated with geolocations within the second section BA. For example, the grouping module may group stationary networking devices SND 4, SND 5, SND 6 and/or SND 7 into the second group. Alternatively and/or additionally, the grouping module may determine a third group of the plurality of groups based upon stationary networking devices that are associated with geolocations within the third section AB. For example, the grouping module may group stationary networking devices SND 8, SND 9 and/or SND 10 into the third group. Alternatively and/or additionally, the grouping module may determine a fourth group of the plurality of groups based upon stationary networking devices that are associated with geolocations within the fourth section BB. For example, the grouping module may group stationary networking devices SND 11, SND 12 and/or SND 13 into the fourth group.

In some examples, the network performance evaluation system 112 may determine the plurality of sets of wireless communication metrics based upon the plurality of groups. For example, the plurality of sets of wireless communication metrics may comprise (i) the first set of wireless communication metrics associated with the first group, (ii) a second set of wireless communication metrics associated with the second group (e.g., the second set of communication metrics may be determined by aggregating metrics associated with stationary networking devices SND 4, SND 5, SND 6 and/or SND 7), (iii) a third set of communication metrics associated with the third group (e.g., the third set of communication metrics may be determined by aggregating metrics associated with stationary networking devices SND 8, SND 9 and/or SND 10), and/or (iv) a fourth set of communication metrics associated with the fourth group (e.g., the fourth set of communication metrics may be determined by aggregating metrics associated with stationary networking devices SND 11, SND 12 and/or SND 13).

In some examples, other sets of wireless communication metrics of the plurality of sets of wireless communication metrics may be determined using one or more of the techniques provided herein with respect to determining the first set of wireless communication metrics associated with the first set of stationary networking devices (e.g., the first stationary networking device SND A or the first group of stationary networking devices). In some examples, other sets of wireless communication metrics of the plurality of sets of wireless communication metrics may each have some or all of the features, characteristics, values, metric types (e.g., the usable types of wireless communication metrics), etc. provided herein with respect to the first set of wireless communication metrics.

Embodiments are contemplated in which each set of wireless communication metrics of one, some or all of the plurality of sets of wireless communication metrics is associated with merely a single stationary networking device (e.g., the first set of wireless communication metrics may be associated with merely the first stationary networking device SND A).

Embodiments are contemplated in which each set of wireless communication metrics of one, some or all of the plurality of sets of wireless communication metrics is associated with a group of stationary networking devices of the plurality of groups (e.g., the first set of wireless communication metrics may be determined by aggregating metrics associated with stationary networking devices of the first group).

At 208, the network performance evaluation system 112 may generate a network performance profile associated with the network performance issue based upon the measurement data. For example, the network performance profile may be indicative of entities (e.g., stationary networking devices, frequency bands, wireless communication sites, wireless communication links, etc.) associated with a change in wireless communication performance over at least a portion of the first period of time. For example, the entities may be associated with a negative change in wireless communication performance (e.g., a decrease in signal quality, an increase in latency, etc.) over at least a portion of the first period of time. For example, the network performance profile may comprise (i) a list of impacted stationary networking devices indicative of one or more first stationary networking devices, (ii) a first list of geolocations associated with stationary networking devices of the list of stationary networking devices, (iii) a list of impacted frequency bands indicative of one or more first frequency bands that are associated with a change (e.g., a negative change) in wireless communication performance, (iv) a list of impacted wireless communication sites indicative of one or more first wireless communication sites that are associated with a change (e.g., a negative change) in wireless communication performance, (v) a second list of geolocations associated with wireless communication sites of the list of wireless communication sites, and/or (vi) a list of impacted wireless communication links indicative of one or more first wireless communication links that are associated with a change (e.g., a negative change) in wireless communication performance.

In an example, the network performance evaluation system 112 may select the first set of stationary networking devices (e.g., the first stationary networking device SND A or the first group of stationary networking devices) for inclusion in the list of impacted stationary networking devices based upon a determination that the first set of stationary networking devices is associated with a first change (e.g., a negative change) in wireless communication performance over at least a portion of the first period of time, such as a change in wireless communication performance that meets a threshold change. In some examples, the network performance profile may be indicative of one or more times associated with one or more changes, such as a time associated with the first change (e.g., times when one or more measurements are performed that are used to identify the first change).

In some examples, the first set of wireless communication metrics may be associated with a plurality of periods of time throughout the first period of time. In some examples, the network performance evaluation system 112 may define a duration for each of the plurality of periods of time (e.g., each of the plurality of periods of time may have the (same) duration). In an example, the duration may be between about 5 minutes to about 60 minutes (e.g., the duration may be about 15 minutes) or other value. In an example, the first set of wireless communication metrics may be indicative of (i) one or more first wireless communication metrics associated with a second period of time of the plurality of periods of times (e.g., an initial period of 15 minutes), (ii) one or more second wireless communication metrics associated with a third period of time of the plurality of times (e.g., a period of 15 minutes following the initial period of 15 minutes), etc. The one or more first wireless communication metrics may comprise one or more values, for one or more of the usable types of wireless communication metrics, in association with the second period of time (e.g., a minimum, maximum, average and/or median wireless communication metric value over the second period of time). The one or more second wireless communication metrics may comprise one or more values, for one or more of the usable types of wireless communication metrics, in association with the third period of time (e.g., a minimum, maximum, average and/or median wireless communication metric value over the third period of time).

The network performance evaluation system 112 may determine a first difference between (i) a first wireless communication metric (e.g., at least one of RSRP, RSRQ, CQI, UL SINR, DL SINR, etc.), of the one or more first wireless communication metrics, associated with wireless communication using a first frequency band between the first set of stationary networking devices and the first wireless communication site WCS A during the second period of time and (ii) a second wireless communication metric (e.g., at least one of RSRP, RSRQ, CQI, UL SINR, DL SINR, etc.), of the one or more second wireless communication metrics, associated with wireless communication using the first frequency band between the first set of stationary networking devices and the first wireless communication site WCS A during the third period of time. The network performance evaluation system 112 may compare the first difference with a first threshold difference. In some examples, in response to the first difference meeting (e.g., exceeding) the first threshold difference, the network performance evaluation system 112 may (i) include the first set of stationary networking devices (e.g., the first stationary networking device SND A or the first group of stationary networking devices) in the list of impacted stationary networking devices, (ii) include the first frequency band in the list of impacted frequency bands, (iii) include the first wireless communication site WCS A in the list of impacted wireless communication sites, and/or (iv) include a first wireless communication link between the first set of stationary networking devices and the first wireless communication site WCS A in the list of impacted wireless communication links (e.g., the first wireless communication link may be indicative of the first frequency band and/or one or more other parameters of communication between the first set of stationary networking devices and the first wireless communication site WCS A). In an example, the first threshold difference may be between about 1 decibel (dB) and about 100 dB (e.g., the first threshold difference may be about 3 dB) or other value. The first difference may correspond to a change in wireless communication performance (as measured by at least one of RSRP, RSRQ, CQI, UL SINR, DL SINR, etc.) from the second period of time to the third period of time for wireless communication between the first set of stationary networking devices and the first wireless communication site WCS A using the first frequency band.

The network performance evaluation system 112 may determine a second difference between (i) a third wireless communication metric (e.g., at least one of RSRP, RSRQ, CQI, UL SINR, DL SINR, etc.), of the one or more first wireless communication metrics, associated with wireless communication using a second frequency band between the first set of stationary networking devices and the first wireless communication site WCS A during the second wireless communication site WCS A during the second period of time and (ii) a fourth wireless communication metric (e.g., at least one of RSRP, RSRQ, CQI, UL SINR, DL SINR, etc.), of the one or more second wireless communication metrics, associated with wireless communication using the second frequency band between the first set of stationary networking devices and the first wireless communication site WCS A during the third period of time. The network performance evaluation system 112 may compare the second difference with a second threshold difference (which may be the same as or different than the first threshold difference, for example). In some examples, the network performance evaluation system 112 does not include the second frequency band in the list of impacted frequency bands based upon a determination that the second difference does not meet (e.g., does not exceed) the second threshold difference. In an example, the second threshold difference may be between about 1 dB and about 100 dB (e.g., the second threshold difference may be about 3 dB) or other value. The second difference may correspond to a change in wireless communication performance (as measured by at least one of RSRP, RSRQ, CQI, UL SINR, DL SINR, etc.) from the second period of time to the third period of time for wireless communication between the first set of stationary networking devices and the first wireless communication site WCS A using the second frequency band.

The network performance evaluation system 112 may determine a third difference between (i) a fifth wireless communication metric (e.g., at least one of RSRP, RSRQ, CQI, UL SINR, DL SINR, etc.), of the one or more first wireless communication metrics, associated with wireless communication between the first set of stationary networking devices and the second wireless communication site WCS B during the second period of time and (ii) a sixth wireless communication metric (e.g., at least one of RSRP, RSRQ, CQI, UL SINR, DL SINR, etc.), of the one or more second wireless communication metrics, associated with wireless communication between the first set of stationary networking devices and the second wireless communication site WCS B during the third period of time. The network performance evaluation system 112 may compare the third difference with a third threshold difference (which may be the same as or different than the first threshold difference and/or the second threshold difference, for example). In some examples, based upon a determination that the third difference does not meet (e.g., does not exceed) the third threshold difference, the network performance evaluation system 112 (i) does not include the second wireless communication site WCS B in the list of impacted wireless communication sites, and/or (ii) does not include a wireless communication link between the first set of stationary networking devices and the second wireless communication site WCS B in the list of impacted wireless communication links. In an example, the third threshold difference may be between about 1 dB and about 100 dB (e.g., the third threshold difference may be about 3 dB) or other value. The third difference may correspond to a change in wireless communication performance (as measured by at least one of RSRP, RSRQ, CQI, UL SINR, DL SINR, etc.) from the second period of time to the third period of time for wireless communication between the first set of stationary networking devices and the second wireless communication site WCS B.

In some examples, the network performance evaluation system 112 may (i) process the measurement data to (e.g., automatically and/or without manual intervention) calculate changes in wireless communication performance between periods of time (e.g., a difference in at least one of RSRP, RSRQ, CQI, UL SINR, DL SINR, etc.) of the plurality of periods of times (e.g., the changes may be computed in an iterative manner and/or in a parallel manner, and/or may include at least one of the first difference, the second difference, the third difference, etc.) for some or all of the plurality of stationary networking devices, and/or (ii) compare the changes with respective thresholds (e.g., at least one of the first threshold difference, the second threshold difference, the third threshold difference, etc.) to identify which stationary networking devices to include in the list of impacted stationary networking devices (e.g., the network performance evaluation system 112 may include devices in the list of impacted stationary networking devices in response to determining the devices are associated with changes that meet respective thresholds).

In some examples, the network performance evaluation system 112 may (i) process the measurement data to (e.g., automatically and/or without manual intervention) calculate changes in wireless communication performance between periods of time of the plurality of periods of times for some or all of the plurality of frequency bands, and/or (ii) compare the changes with respective thresholds to identify which frequency bands to include in the list of impacted frequency bands (e.g., the network performance evaluation system 112 may include frequency bands in the list of impacted frequency bands in response to determining the frequency bands are associated with changes that meet respective thresholds).

In some examples, the network performance evaluation system 112 may (i) process the measurement data to (e.g., automatically and/or without manual intervention) calculate changes in wireless communication performance between periods of time of the plurality of periods of times for wireless communication sites of the telecommunication service provider, and/or (ii) compare the changes with respective thresholds to identify which wireless communication sites to include in the list of impacted wireless communication sites (e.g., the network performance evaluation system 112 may include wireless communication sites in the list of impacted wireless communication sites in response to determining the wireless communication sites are associated with changes that meet respective thresholds).

In some examples, the network performance evaluation system 112 may (i) process the measurement data to (e.g., automatically and/or without manual intervention) calculate changes in wireless communication performance between periods of time of the plurality of periods of times for some or all wireless communication links between wireless communication sites of the telecommunication service provider and some or all of the plurality of stationary networking devices, and/or (ii) compare the changes with respective thresholds to identify which wireless communication links to include in the list of impacted wireless communication links (e.g., the network performance evaluation system 112 may include wireless communication links in the list of impacted wireless communication links in response to determining the wireless communication links are associated with changes that meet respective thresholds).

In some examples, the network performance evaluation system 112 may (i) process the measurement data to (e.g., automatically and/or without manual intervention) calculate changes in wireless communication performance between periods of time of the plurality of periods of times for (A) some or all of the plurality of stationary networking devices, (B) some or all of the plurality of frequency bands, (C) wireless communication sites of the telecommunication service provider, and/or (D) some or all wireless communication links between wireless communication sites of the telecommunication service provider and some or all of the plurality of stationary networking devices, (ii) compare the changes with respective thresholds to identify a group of changes in wireless communication performance which meet (e.g., exceed) respective thresholds (e.g., the group of changes may include the first difference, etc.), (iii) regroup and/or categorize changes of the group of changes (and/or metrics associated with the changes) by at least one of stationary networking device, frequency band, wireless communication site, wireless communication link, signal source, etc. to identify at least one of the one or more first stationary networking devices for inclusion in the list of impacted stationary networking devices, the one or more first frequency bands for inclusion in the list of impacted frequency bands, the one or more first wireless communication sites for inclusion in the list of impacted wireless communication sites, the one or more first wireless communication links for inclusion in the list of impacted wireless communication links, etc.

In some examples, the network performance evaluation system 112 may implement an adaptive threshold function to automatically configure, maintain and/or update one or more thresholds for comparison with one or more wireless communication metrics of the measurement data. The adaptive threshold function may be implemented using historical RF measurements and/or real-time monitoring of RF measurements. In an example, the network performance evaluation system 112 may analyze historical wireless communication metrics of a first type associated with wireless communication between the first stationary networking device SND A and the first wireless communication site WCS A to determine a first threshold metric for wireless communication metrics of the first type (e.g., at least one of RSRP, RSRQ, CQI, UL SINR, DL SINR, etc.). The historical wireless communication metrics may be derived from signal measurements performed during a fourth period of time (which may be the same as or different than the first period of time). The fourth period of time may be a greater duration than the first period of time. In an example, the fourth period of time may correspond to a most recent period of 24 hours, and/or the first period of time may correspond to a most recent period of 1 hour.

In an example, the first threshold metric may correspond to a threshold SINR used for comparison with SINR values (e.g., UL SINR or DL SINR values) associated with wireless communication between the first stationary networking device SND A and the first wireless communication site WCS A. The threshold SINR may be determined based upon SINR values derived from signal measurements performed (by the first stationary networking device SND A and/or the first wireless communication site WCS A, for example) during the fourth period of time. For example, the threshold SINR may be determined based upon a minimum SINR value of the SINR values. In an example, the threshold SINR may be determined to be min-k, where min may correspond to the minimum SINR value and/or k may correspond to a constant (e.g., a predefined threshold, such as 3 dB or other value). In an example in which the minimum SINR value is 15 dB (e.g., the minimum SINR value for the most recent 24 hours of data is 15 dB) and/or k is 3 dB, the adaptive threshold function may determine the first threshold metric to be 12 dB. The network performance evaluation system 112 may compare a SINR value indicated by the measurement data with the threshold SINR (e.g., 12 dB) to determine whether the SINR value is associated with a change that meets a threshold change. In response to determining the SINR value is less than the threshold SINR, the network performance evaluation system 112 may (i) include the first set of stationary networking devices in the list of impacted stationary networking devices, (ii) include the first frequency band in the list of impacted frequency bands, (iii) include the first wireless communication site WCS A in the list of impacted wireless communication sites, and/or (iv) include the first wireless communication link in the list of impacted wireless communication links. The network performance evaluation system 112 may implement the adaptive threshold function periodically and/or continuously (and/or aperiodically and/or discontinuously) to update the first threshold metric (such as in response to more recent data becoming available to update the first threshold metric). In some examples, the adaptive threshold function may be implemented for one, some or all metrics of the measurement data, to provide for automatic and/or dynamic adjustment of thresholds. It may be appreciated that implementing the adaptive threshold function may provide for improved computational efficiency and/or processing speed of identifying metrics associated with changes (e.g., significant changes that meet thresholds), such as due, at least in part, to not needing to determine a difference in order to make a determination of whether a wireless communication metric is associated with a change that meets a threshold change (e.g., the SINR value may be compared with the threshold SINR directly rather than needing to determine differences between the SINR value and other prior SINR values and comparing the differences with a threshold).

In some examples, the network performance evaluation system 112 may evaluate the network performance issue based upon at least some information included in the network performance profile. For example, the evaluation may be performed based upon at least one of the list of impacted stationary networking devices, the first list of geolocations, the list of impacted frequency bands, the list of impacted wireless communication sites, the second list of geolocations, the list of impacted wireless communication links, etc. In an example, the network performance evaluation system 112 may perform the evaluation to determine a first source of the network performance issue and/or to isolate a problem area associated with the network performance issue to a first region of interest. In some examples, the network performance evaluation system 112 may generate the network performance profile to be indicative of the first source and/or the first region of interest. In some examples, the network performance evaluation system 112 may perform and/or facilitate one or more corrective actions in response to evaluating the first network performance issue (and/or in response to generating the network performance profile and/or determining the first source and/or the first region of interest).

In some examples, the first region of interest may define a geographical area in which the first source of the network performance issue is determined (e.g., predicted) to be located. The network performance evaluation system 112 may determine the geographical area of the first region of interest based upon the first list of geolocations associated with stationary networking devices of the list of stationary networking devices, the second list of geolocations associated with wireless communication sites of the list of wireless communication sites and/or geolocations of wireless communication links of the list of impacted wireless communication links (e.g., a geolocation of a wireless communication link may be derived from geolocations of a stationary networking device and a wireless communication site between which the wireless communication link is established). Alternatively and/or additionally, the first region of interest may define a network segment corresponding to one or more networking components of the telecommunication service provider. In some examples, the one or more corrective actions may comprise one or more actions to improve network performance associated with the one or more networking components of the first region of interest. For example, the one or more corrective actions may comprise allocating resources (e.g., increased resources), such as at least one of manpower, a maintenance device, energy (e.g., increased power for increased transmit power), one or more spectrums, equipment, one or more antennas, etc. to the first region of interest to remedy (e.g., solve) the network performance issue. Alternatively and/or additionally, the one or more corrective actions may comprise (i) modifying network resources associated with a component (e.g., a wireless communication site, a UE, etc.) of the first region of interest (e.g., allocating a new set of network resources for use by the component), (ii) switching a network slice assigned to a component of the first region of interest (e.g., switching a network slice assigned to the component from a first network slice to a second network slice), (iii) modifying one or more Quality of Service (QOS) parameters associated with a component of the first region of interest (e.g., increasing QoS level assigned to the component), (iv) modifying a priority of traffic of a component of the first region of interest (e.g., increasing a priority of traffic of the component to prioritize the traffic over other traffic), and/or (v) one or more other actions. Accordingly, in some examples, the one or more corrective actions may improve network performance of the component, and thus may remedy (e.g., solve) the first network performance issue.

Alternatively and/or additionally, in response to identifying the first region of interest of the first network performance issue, the network performance evaluation system 112 may (i) deploy one or more resources to one or more components (e.g., malfunctioning components) of the first region of interest, (ii) reconfigure, repair and/or replace one or more components (e.g., malfunctioning components) of the first region of interest, (iii) perform a software update for one or more components (e.g., malfunctioning components) of the first region of interest, and/or (iv) transmit information, associated with one or more components of the first region of interest, to a network maintenance device associated with a network maintenance agent (e.g., a person, a robot, etc. tasked with repairing and/or performing maintenance for network malfunctioning network components). The network maintenance agent may use the information to repair, reconfigure and/or replace one or more malfunctioning components of the first region of interest.

In some examples, the network performance evaluation system 112 may provide the network performance profile to a first client device for display. For example, the first client device (e.g., a laptop, a phone, a tablet, etc.) may display a representation of at least some information of the network performance profile associated with the network performance issue (e.g., the representation may be used by a network management agent to at least one of diagnose, evaluate, solve, etc. the network performance issue). For example, the representation may comprise at least one of a graphical object (e.g., a visual network diagram), text, etc. which identify information (e.g., geolocations and/or other characteristics) of entities associated with the network performance issue, such as the one or more first stationary networking devices, the one or more first frequency bands, the one or more first wireless communication sites, the one or more first wireless communication links, the first source and/or the first region of interest.

It may be appreciated that using the grouping module to group the plurality of stationary devices into the plurality of groups, and/or aggregating the measurement data according to the plurality of groups provides for improved computational efficiency and/or processing speed of analyzing the plurality of sets of wireless communication metrics to generate the network performance profile and/or evaluate the network performance issue, such as due, at least in part, to reducing an amount of data that needs to be processed for generating the network performance profile (e.g., aggregating the measurement data results in reduced amount of metrics that need to be processed by the network performance evaluation system 112 to generate the network performance profile and/or evaluate the network performance issue.

Figure 1E:
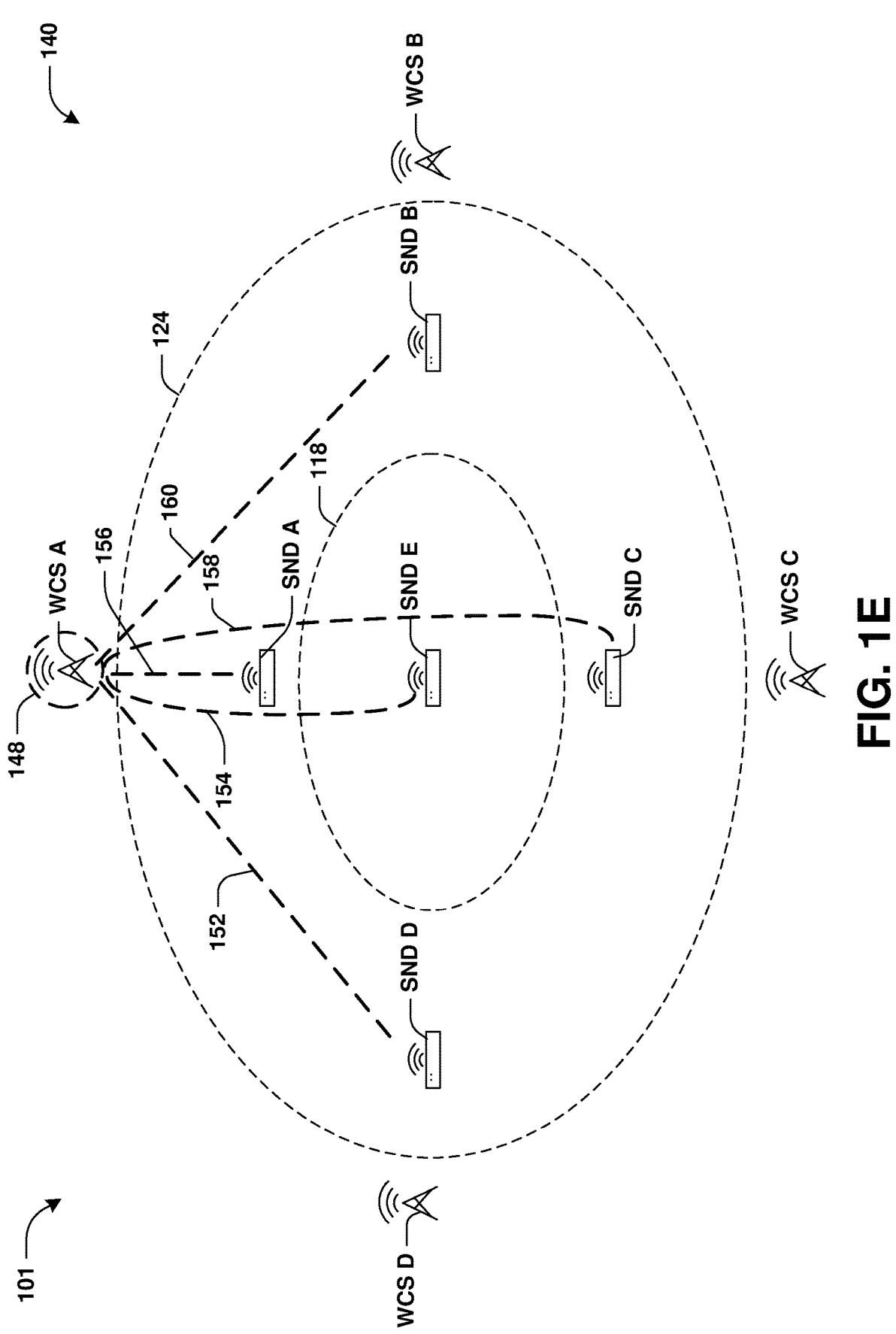
FIG. 1E is a diagram illustrating at least a portion of a network performance profile in accordance with an embodiment.

FIG. 1E illustrates a representation 140 of at least a portion of the network performance profile in a first example scenario. In the first example scenario, the list of impacted wireless communication links of the network performance profile may be indicative of wireless communication links 152, 154, 156, 158 and/or 160 between the first wireless communication site WCS A and respective stationary networking devices SND D, SND E, SND A, SND C and/or SND B. Wireless communication links 152, 154, 156, 158 and/or 160 may each define one or more impacted frequency bands associated with communication between the first wireless communication site WCS A and a stationary networking device. For example, the wireless communication link 152 may identify one or more first impacted frequency bands associated with communication between the first wireless communication site WCS A and the fourth stationary networking device SND D (e.g., the one or more first impacted frequency bands may be associated with and/or negatively impacted by the network performance issue). The wireless communication link 154 may identify one or more second impacted frequency bands associated with communication between the first wireless communication site WCS A and the fifth stationary networking device SND E (e.g., the one or more second impacted frequency bands may be associated with and/or negatively impacted by the network performance issue). In some examples, in the first example scenario, the network performance evaluation system 112 may determine that the first source of the network performance issue includes and/or is associated with the first wireless communication site WCS A. Alternatively and/or additionally, the network performance evaluation system 112 may determine that the first source of the network performance issue includes and/or is associated with a malfunctioning C-band networking component (e.g., an antenna and/or other networking component of the first wireless communication site WCS A that may need to be repaired and/or updated) based upon the list of impacted frequency bands being indicative of C-band. The network performance profile may be indicative of a representation 148 of the geographical area of the first region of interest (e.g., the geographical area may identify a location of the first wireless communication site WCS A).

Figure 1F:
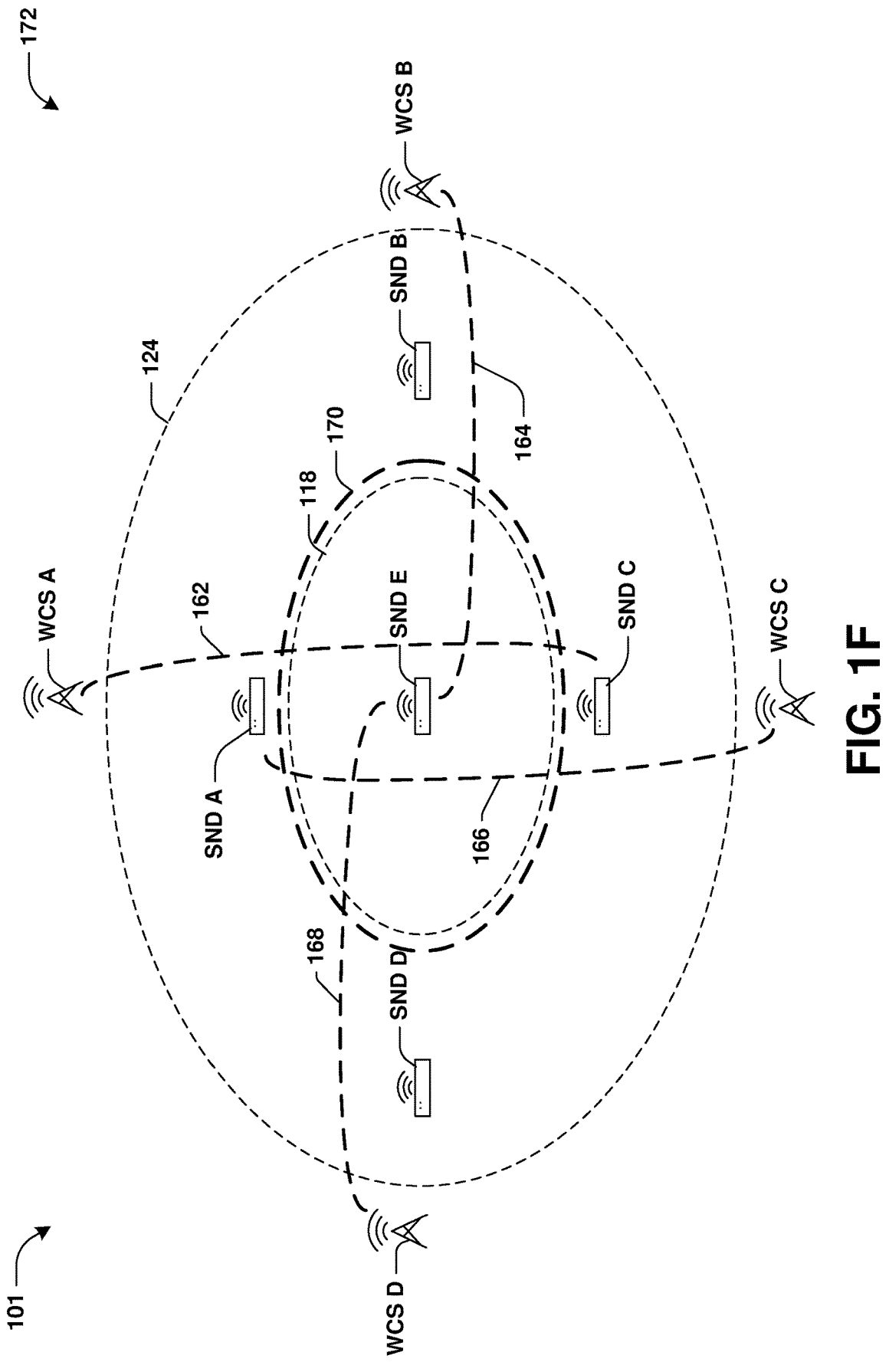
FIG. 1F is a diagram illustrating at least a portion of a network performance profile in accordance with an embodiment.

FIG. 1F illustrates a representation 172 of at least a portion of the network performance profile in a second example scenario. In the second example scenario, the list of impacted wireless communication links of the network performance profile may be indicative of wireless communication link 162 between WCS A and SND C, wireless communication link 164 between WCS B and SND E, wireless communication link 166 between WCS C and SND A and/or wireless communication link 168 between WCS D and SND E. In some examples, in the second example scenario, the network performance evaluation system 112 may determine that the first source of the network performance issue includes and/or is associated with a source of interference in a first interference area corresponding to the first region of interest (e.g., the first interference area may comprise, may overlap with and/or may be proximal to the network issue location 118). The network performance profile may be indicative of a representation 170 of the first interference area. The network performance evaluation system 112 may identify the first interference area based upon a determination that wireless communication links 162, 164, 166 and/or 168 pass through the first interference area.

Figure 1G:
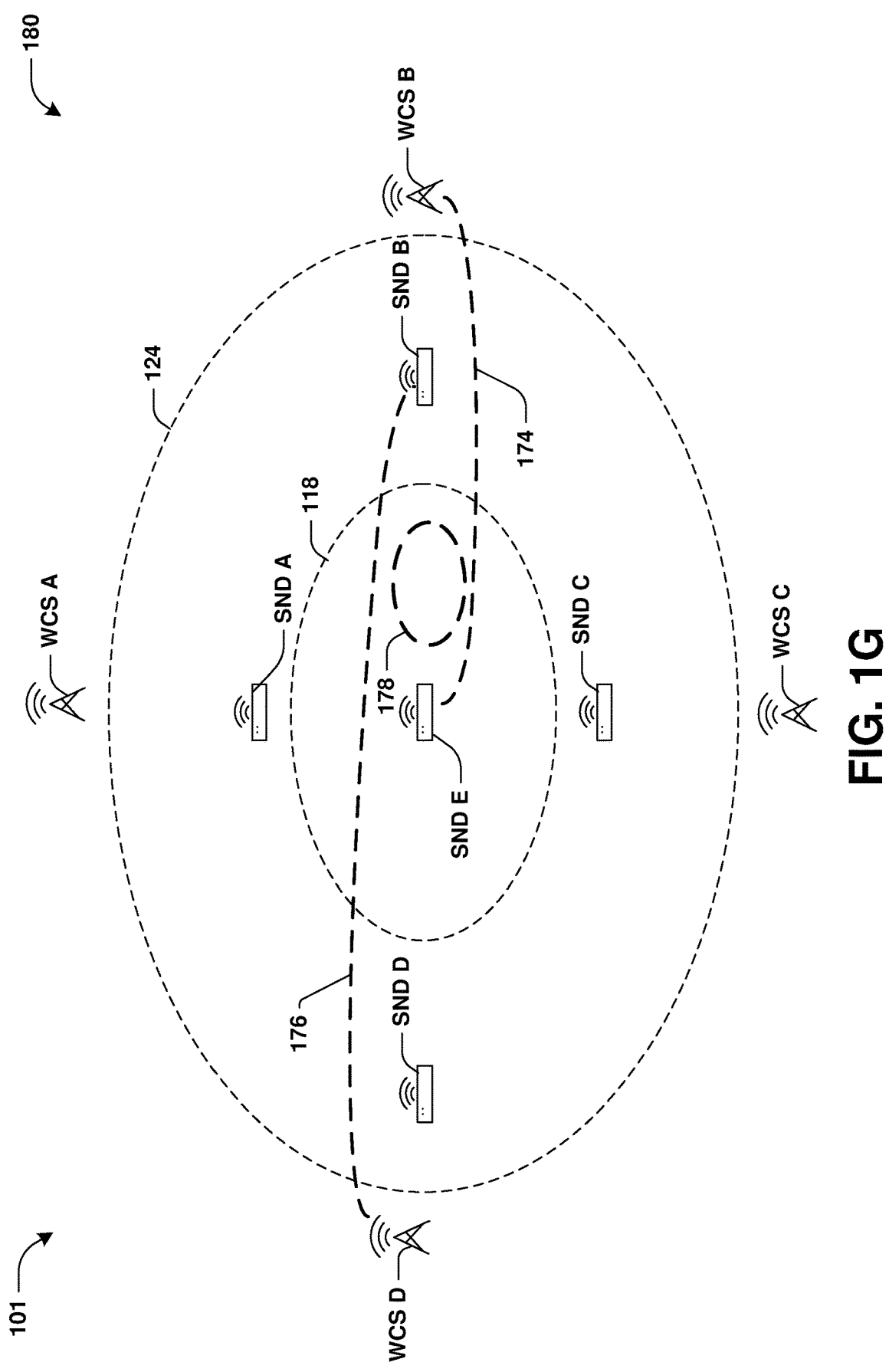
FIG. 1G is a diagram illustrating at least a portion of a network performance profile in accordance with an embodiment.

FIG. 1G illustrates a representation 180 of at least a portion of the network performance profile in a third example scenario. In the third example scenario, the list of impacted wireless communication links of the network performance profile may be indicative of wireless communication link 174 between WCS B and SND E and/or wireless communication link 176 between WCS D and SND B. In some examples, in the third example scenario, the network performance evaluation system 112 may determine that the first source of the network performance issue includes and/or is associated with a source of interference in a second interference area corresponding to the first region of interest (e.g., the second interference area may comprise a subsection of a geographical area defined by the network issue location 118). The network performance profile may be indicative of a representation 178 of the second interference area. The network performance evaluation system 112 may identify the second interference area based upon a determination that wireless communication links 174 and/or 176 pass through the second interference area. The network performance evaluation system 112 may provide the representation 140, the representation 172, the representation 180, etc. to a client device (e.g., the first client device) for display.

Figure 3:
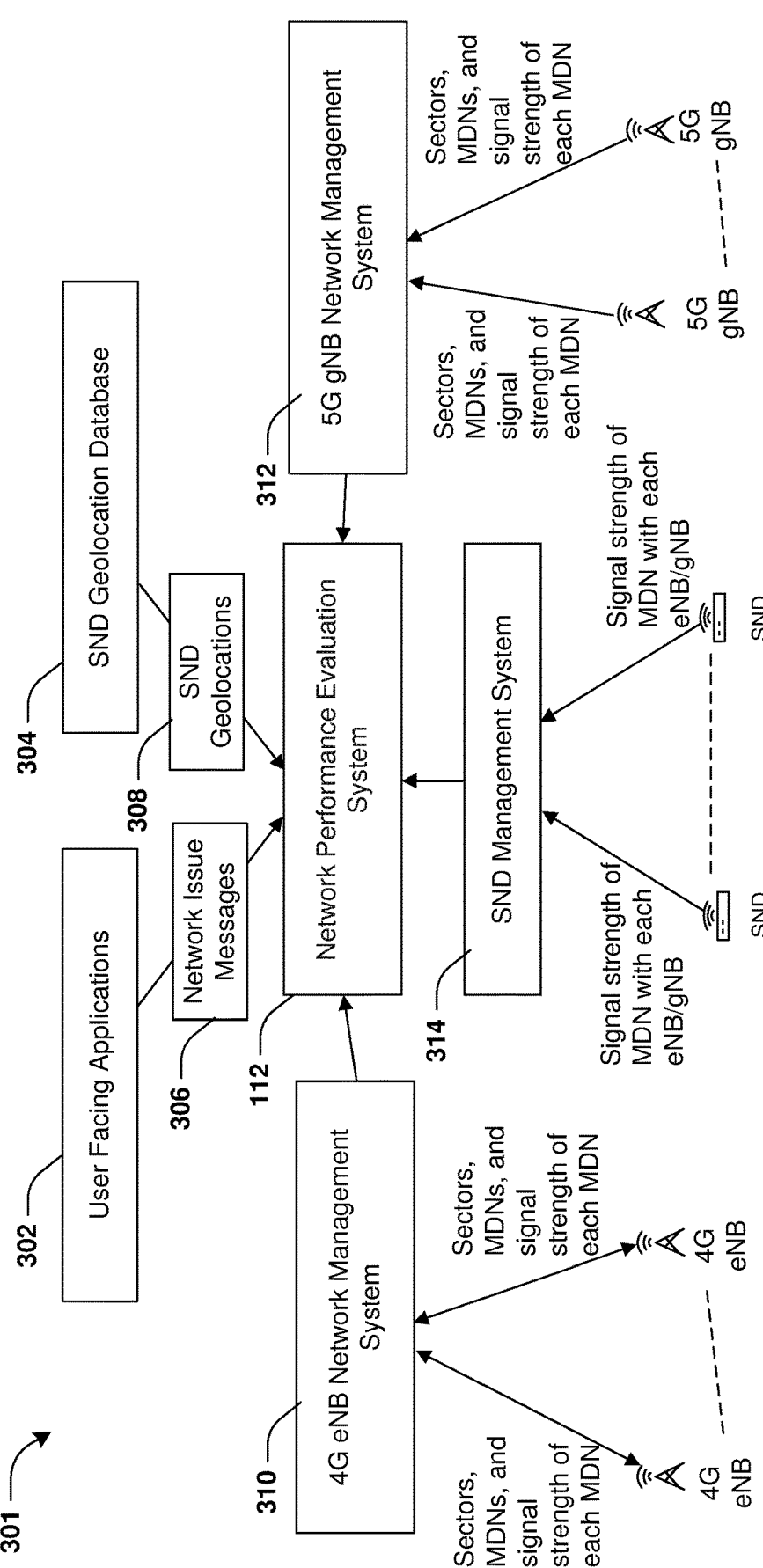
FIG. 3 is a network diagram associated with a system in accordance with an embodiment.

FIG. 3 illustrates an example of a system 301 comprising the network performance evaluation system 112. The network performance evaluation system 112 may receive network issue messages 306 from user facing applications (e.g., mobile applications, web applications, etc.). The network performance evaluation system 112 may retrieve geolocations 308 of stationary networking devices from the geolocation database (shown with reference number 304). The network performance evaluation system 112 may identify stationary networking devices using Mobile Directory Numbers (MDNs) (and/or other types of identifiers) associated with the stationary networking devices. The system 301 may comprise a 4G network management system 310 configured to retrieve information (e.g., sectors, MDNs, signal strength measurements, etc.) from base stations (e.g., eNBs), and/or may provide the information to the network performance evaluation system 112 (for use in deriving the measurement data and/or generating the network performance profile, for example). The system 301 may comprise a 5G network management system 312 configured to retrieve information (e.g., sectors, MDNs, signal strength measurements, etc.) from base stations (e.g., gNBs), and/or may provide the information to the network performance evaluation system 112 (for use in deriving the measurement data and/or generating the network performance profile, for example). The system 301 may comprise a SND management system 312 configured to retrieve information (e.g., signal strength measurements, etc.) from stationary networking devices, and/or may provide the information to the network performance evaluation system 112 (for use in deriving the measurement data and/or generating the network performance profile, for example).

Figure 4:
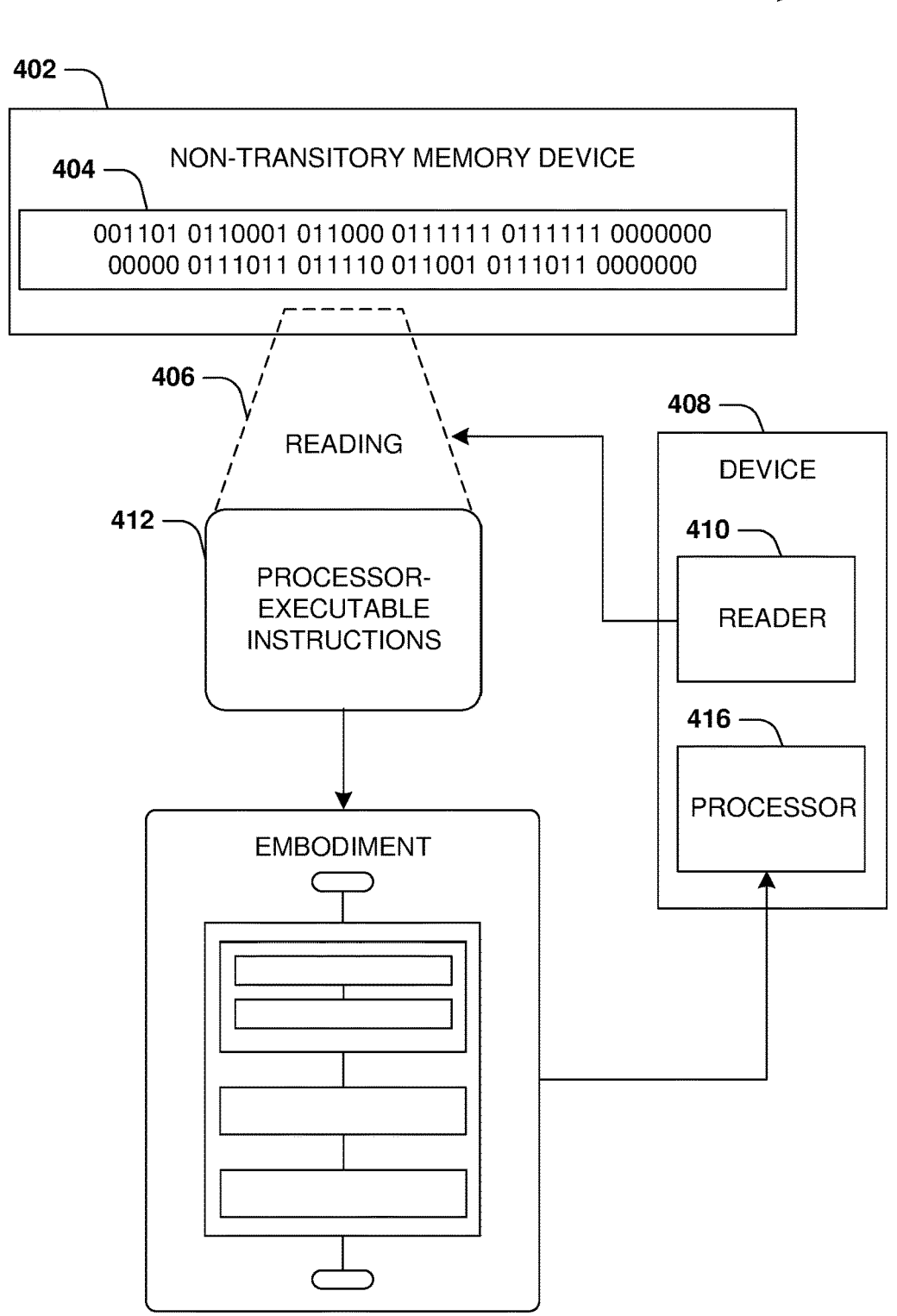
FIG. 4 is an illustration of a scenario featuring an example non-transitory machine readable medium in accordance with one or more of the provisions set forth herein.

FIG. 4 is an illustration of a scenario 400 involving an example non-transitory machine readable medium 402. The non-transitory machine readable medium 402 may comprise processor-executable instructions 412 that when executed by a processor 416 cause performance (e.g., by the processor 416) of at least some of the provisions herein. The non-transitory machine readable medium 402 may comprise a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 402 stores computer-readable data 404 that, when subjected to reading 406 by a reader 410 of a device 408 (e.g., a read head of a hard disk drive, or a read operation invoked on a solid-state storage device), express the processor-executable instructions 412. In some embodiments, the processor-executable instructions 412, when executed cause performance of operations, such as at least some of the example method 200 of FIG. 2, for example. In some embodiments, the processor-executable instructions 412 are configured to cause implementation of a system, such as at least some of the example system 101 of FIGS. 1A-1G and/or the example system 301 of FIG. 3, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

responsive to an indication of a network performance issue, identifying a location associated with the network performance issue;

responsive to identifying the location associated with the network performance issue, identifying a plurality of stationary networking devices proximal the location;

responsive to identifying the plurality of stationary networking devices proximal the location, retrieving measurement data associated with wireless communication between (i) the plurality of stationary networking devices and (ii) wireless communication sites of a telecommunication service provider, wherein the measurement data is derived from signal measurements performed during a period of time;

responsive to retrieving the measurement data, analyzing the measurement data to identify one or more first stationary networking devices, of the plurality of stationary networking devices, associated with a change in wireless communication performance over at least a portion of the period of time; and evaluating the network performance issue based upon one or more geolocations of the one or more first stationary networking devices.

2. The method of claim 1, wherein evaluating the network performance issue comprises:

determining a source of the network performance issue.

3. The method of claim 1, wherein evaluating the network performance issue comprises:

isolating a problem area associated with the network performance issue to a region of interest.

4. The method of claim 3, comprising:

allocating one or more resources to the region of interest to remedy the network performance issue.

5. The method of claim 1, wherein the measurement data comprises:

a first set of wireless communication metrics, associated with a first set of stationary networking devices, comprising:

one or more first wireless communication metrics associated with wireless communication between the first set of stationary networking devices and a first wireless communication site of the telecommunication service provider; and one or more second wireless communication metrics associated with wireless communication between the first set of stationary networking devices and a second wireless communication site of the telecommunication service provider; and a second set of wireless communication metrics, associated with a second set of stationary networking devices of the plurality of stationary networking devices, comprising:

one or more third wireless communication metrics associated with wireless communication between the second set of stationary networking devices and the first wireless communication site; and one or more fourth wireless communication metrics associated with wireless communication between the second set of stationary networking devices and the second wireless communication site.

6. The method of claim 5, wherein:

the plurality of stationary networking devices are associated with geolocations within an area; and the method comprises:

applying a grid to an area to define a plurality of sections of the area; and grouping, based upon the plurality of sections, the plurality of stationary networking devices into a plurality of sets of stationary networking devices, wherein grouping the plurality of stationary networking devices into the plurality of sets of stationary networking devices comprises:

grouping a first stationary networking device and a second stationary networking device into the first set of stationary networking devices based upon a first geolocation of the first stationary networking device and a second geolocation of the second stationary networking device being within a first section of the plurality of sections; and grouping a third stationary networking device and a fourth stationary networking device into the second set of stationary networking devices based upon a third geolocation of the third stationary networking device and a fourth geolocation of the fourth stationary networking device being within a second section of the plurality of sections.

7. The method of claim 6, wherein retrieving the measurement data comprises:

retrieving first measurement data associated with wireless communication between the first stationary networking device and the first wireless communication site;

retrieving second measurement data associated with wireless communication between the second stationary networking device and the first wireless communication site; and determining the one or more first wireless communication metrics based upon the first measurement data and the second measurement data.

8. The method of claim 1, wherein identifying the one or more first stationary networking devices comprises:

including a first stationary networking device in the one or more first stationary networking devices based upon a determination that a difference between a first wireless communication metric associated with a first time and a second wireless communication metric associated with a second time meets a threshold difference, wherein the first wireless communication metric and the second wireless communication metric are associated with the first stationary networking device.

9. The method of claim 1, wherein identifying the location comprises:

identifying the location in response to receiving network issue messages, associated with the location, amounting to at least a threshold quantity of messages.

10. The method of claim 1, wherein identifying the plurality of stationary networking devices comprises:

including a stationary networking device in the plurality of stationary networking devices based upon a determination that a geolocation associated with the stationary networking device is within a threshold distance of the location associated with the network performance issue.

11. A non-transitory computer-readable medium storing instructions that when executed perform operations comprising:

responsive to an indication of a network performance issue, identifying a location associated with the network performance issue;

responsive to identifying the location associated with the network performance issue, identifying a plurality of stationary networking devices proximal the location;

responsive to identifying the plurality of stationary networking devices proximal the location, retrieving measurement data associated with wireless communication between (i) the plurality of stationary networking devices and (ii) wireless communication sites of a telecommunication service provider, wherein the measurement data is derived from signal measurements performed during a period of time;

analyzing the measurement data to identify one or more first stationary networking devices, of the plurality of stationary networking devices, associated with a change in wireless communication performance over at least a portion of the period of time; and evaluating the network performance issue based upon one or more geolocations of the one or more first stationary networking devices.

12. The non-transitory computer-readable medium of claim 11, wherein evaluating the network performance issue comprises:

determining a source of the network performance issue.

13. The non-transitory computer-readable medium of claim 11, wherein evaluating the network performance issue comprises:

isolating a problem area associated with the network performance issue to a region of interest.

14. The non-transitory computer-readable medium of claim 13, the operations comprising:

allocating one or more resources to the region of interest to remedy the network performance issue.

15. The non-transitory computer-readable medium of claim 11, wherein the measurement data comprises:

a first set of wireless communication metrics, associated with a first set of stationary networking devices, comprising:

one or more first wireless communication metrics associated with wireless communication between the first set of stationary networking devices and a first wireless communication site of the telecommunication service provider; and one or more second wireless communication metrics associated with wireless communication between the first set of stationary networking devices and a second wireless communication site of the telecommunication service provider; and a second set of wireless communication metrics, associated with a second set of stationary networking devices of the plurality of stationary networking devices, comprising:

one or more third wireless communication metrics associated with wireless communication between the second set of stationary networking devices and the first wireless communication site; and one or more fourth wireless communication metrics associated with wireless communication between the second set of stationary networking devices and the second wireless communication site.

16. The non-transitory computer-readable medium of claim 15, wherein:

the plurality of stationary networking devices are associated with geolocations within an area; and the operations comprise:

applying a grid to an area to define a plurality of sections of the area; and grouping, based upon the plurality of sections, the plurality of stationary networking devices into a plurality of sets of stationary networking devices, wherein grouping the plurality of stationary networking devices into the plurality of sets of stationary networking devices comprises:

grouping a first stationary networking device and a second stationary networking device into the first set of stationary networking devices based upon a first geolocation of the first stationary networking device and a second geolocation of the second stationary networking device being within a first section of the plurality of sections; and grouping a third stationary networking device and a fourth stationary networking device into the second set of stationary networking devices based upon a third geolocation of the third stationary networking device and a fourth geolocation of the fourth stationary networking device being within a second section of the plurality of sections.

17. The non-transitory computer-readable medium of claim 16, wherein retrieving the measurement data comprises:

retrieving first measurement data associated with wireless communication between the first stationary networking device and the first wireless communication site;

retrieving second measurement data associated with wireless communication between the second stationary networking device and the first wireless communication site; and determining the one or more first wireless communication metrics based upon the first measurement data and the second measurement data.

18. The non-transitory computer-readable medium of claim 11, wherein identifying the one or more first stationary networking devices comprises:

including a first stationary networking device in the one or more first stationary networking devices based upon a determination that a difference between a first wireless communication metric associated with a first time and a second wireless communication metric associated with a second time meets a threshold difference, wherein the first wireless communication metric and the second wireless communication metric are associated with the first stationary networking device.

19. A computer comprising:

a processor coupled to memory, the processor configured to execute instructions from the memory to perform operations comprising:

responsive to an indication of a network performance issue, identifying a location associated with the network performance issue;

responsive to identifying the location associated with the network performance issue, identifying a plurality of stationary networking devices proximal the location;

responsive to identifying the plurality of stationary networking devices proximal the location, retrieving measurement data associated with wireless communication between (i) the plurality of stationary networking devices and (ii) wireless communication sites of a telecommunication service provider, wherein the measurement data is derived from signal measurements performed during a period of time; and generating a network performance profile associated with the network performance issue based upon the measurement data.

20. The computer of claim 19, the operations comprising:

providing a representation of the network performance profile to a client device for display.

* * * * *